(12) United States Patent
Allen et al.

(10) Patent No.: US 9,210,240 B2
(45) Date of Patent: Dec. 8, 2015

(54) PORTABLE SLIDABLE ELECTRONIC DEVICE HAVING A DYNAMIC FLEX ALIGNMENT SCHEME AND METHODS OF ASSEMBLING SAME

(75) Inventors: Aaron Robert Allen, Pembroke Pines, FL (US); Shawn Glenfield Bernard, Deerfield Beach, FL (US); Patrick Yves Mas, Sunrise, FL (US); Martin Earl Holman, IV, West Palm Beach, FL (US); Felipe Alonso Varela, Sunrise, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 298 days.

(21) Appl. No.: 13/579,260

(22) PCT Filed: Feb. 15, 2011

(86) PCT No.: PCT/CA2011/000176
§ 371 (c)(1),
(2), (4) Date: Aug. 15, 2012

(87) PCT Pub. No.: WO2011/097718
PCT Pub. Date: Aug. 18, 2011

(65) Prior Publication Data
US 2012/0314386 A1    Dec. 13, 2012

Related U.S. Application Data

(60) Provisional application No. 61/304,721, filed on Feb. 15, 2010.

(51) Int. Cl.
*H05K 5/00* (2006.01)
*H05K 7/00* (2006.01)
(Continued)

(52) U.S. Cl.
CPC ........... *H04M 1/0237* (2013.01); *G06F 1/1624* (2013.01); *G06F 1/1683* (2013.01); *H02G 11/00* (2013.01); *H02G 3/30* (2013.01); *H04M 1/0277* (2013.01)

(58) Field of Classification Search
CPC ............................. G06F 1/1622; G06F 1/1624
USPC ............... 361/679.01–679.09, 679.1–679.19, 361/679.31–679.45, 679.55–679.6, 361/724–747; 248/80–88, 155.1–155.5, 248/166–173, 180.1–186.2, 229.1–231.51, 248/271.4, 292.14, 316.1–316.8; 292/1–62, 292/113, 169.11–169.23, 341.11–341.19
See application file for complete search history.

(56) References Cited

U.S. PATENT DOCUMENTS 5,151,946 A    9/1992   Martensson
5,507,668 A    4/1996   Lambrinos et al.
(Continued)

OTHER PUBLICATIONS

International Bureau of WIPO, International Search Report and Written Opinion of the International Searching Authority issued in connection with International application No. PCT/CA2011/000176, Jun. 8, 2011, 9 pages.
(Continued)

*Primary Examiner* — Jerry Wu
(74) *Attorney, Agent, or Firm* — Fish & Richardson P.C.

(57) ABSTRACT

According to one aspect, a portable electronic device that includes a base portion and a sliding portion. The sliding portion is adapted to be coupled to the base portion and slideable relative thereto between a closed position and an open position. The device also includes a flex connector coupled to the sliding portion, the flex connector having a connector end, a dynamic region, and an intermediate coupler between the connector end and the dynamic region. The device also includes a guide base slidably coupled to the sliding portion, the guide base being adapted to be mechanically coupled to the intermediate coupler so as to secure the flex connector to the guide base before the sliding portion is coupled to the base portion.

20 Claims, 12 Drawing Sheets

(51) Int. Cl.
*A47G 1/10* (2006.01)
*G11B 33/02* (2006.01)
*H04M 1/02* (2006.01)
*G06F 1/16* (2006.01)
*H02G 11/00* (2006.01)
*H02G 3/30* (2006.01)

(56) References Cited

U.S. PATENT DOCUMENTS

| | | | |
|---|---|---|---|
| 6,973,186 | B2 | 12/2005 | Shin |
| 7,596,396 | B2 | 9/2009 | Fagrenius et al. |
| 2006/0285302 | A1 | 12/2006 | Kim |
| 2007/0115255 | A1* | 5/2007 | Pan ............................ 345/156 |
| 2007/0270180 | A1 | 11/2007 | Takagi |
| 2009/0061956 | A1 | 3/2009 | Matsuoka |
| 2009/0137293 | A1 | 5/2009 | Yoo et al. |
| 2009/0229081 | A1 | 9/2009 | Demuynck |
| 2010/0195296 | A1* | 8/2010 | Nishiwaki ..................... 361/752 |
| 2011/0228491 | A1* | 9/2011 | Sakai et al. ................... 361/749 |

OTHER PUBLICATIONS

Office Action issued in Canadian Application No. 2,788,765 on Jun. 30, 2015; 4 pages.

* cited by examiner

PORTABLE SLIDABLE ELECTRONIC DEVICE HAVING A DYNAMIC FLEX ALIGNMENT SCHEME AND METHODS OF ASSEMBLING SAME

RELATED APPLICATIONS

This application claims the benefit of U.S. Provisional Application Ser. No. 61/304,721 entitled PORTABLE SLIDABLE ELECTRONIC DEVICE HAVING A DYNAMIC FLEX ALIGNMENT SCHEME, filed on Feb. 15, 2010, the entire contents of which are hereby incorporated by reference herein for all purposes.

FIELD OF TECHNOLOGY

The embodiments herein relate to portable electronic devices, and more particularly to portable electronic devices having a sliding portion and base portion movable between an open position and a closed position and having a dynamic flex connector therebetween, and methods for assembling such portable electronic devices.

INTRODUCTION

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), tablets and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay may be useful on such handheld devices as such handheld devices tend to be small and therefore limited in space available for user input and output devices. Further, the screen content on the touch-sensitive devices can normally be modified depending on the functions and operations being performed.

BRIEF DESCRIPTION OF THE DRAWINGS

Embodiments of the present disclosure will now be described, by way of example only, with reference to the attached figures, wherein.

DETAILED DESCRIPTION

The following describes an electronic device that includes a housing, a touch-sensitive display exposed by a front of the housing, and functional components comprising memory and a processor coupled to the memory and the touch-sensitive display.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

In other instances, well-known methods, procedures and components have not been described in detail so as not to obscure the example embodiments described herein. Also, the description is not to be considered as limited to the scope of the example embodiments described herein.

Figure 1:
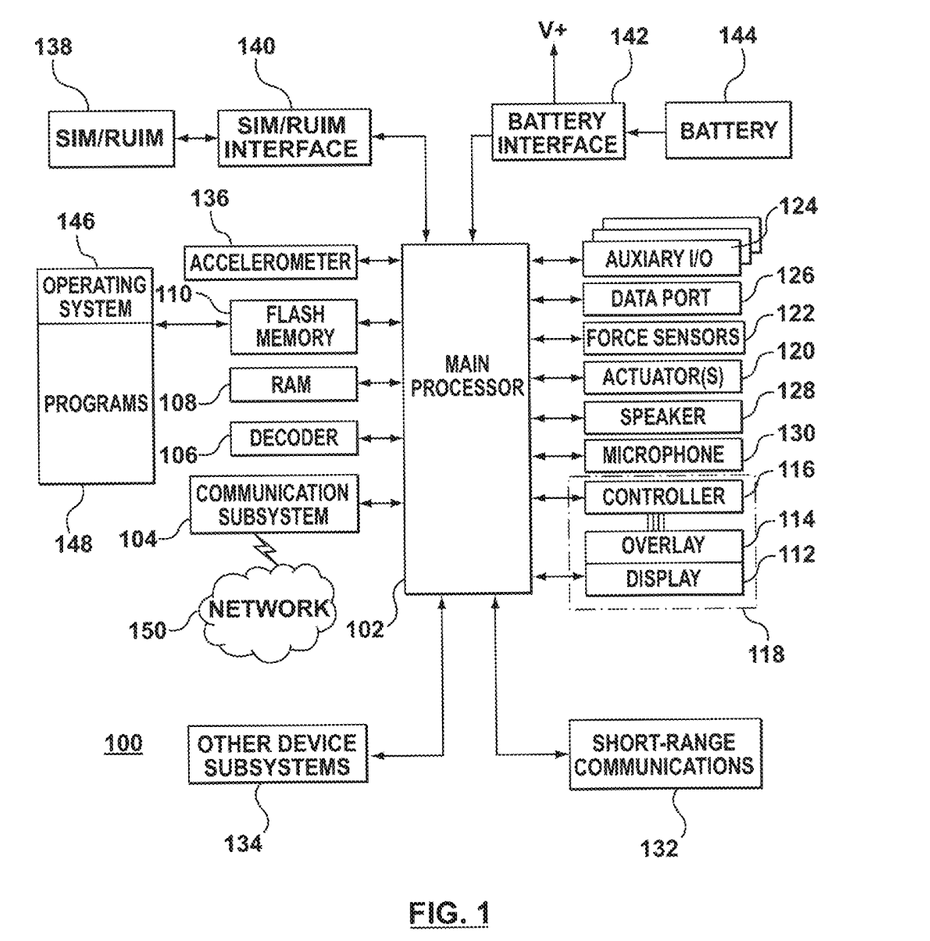
FIG. 1 is a simplified block diagram of components including internal components of a portable electronic device according to one embodiment.

FIG. 1 shows a simplified block diagram of components including internal components of a portable electronic device 100 according to one embodiment.

The portable electronic device 100 includes multiple components such as a processor 102 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications over the same physical base stations.

The portable electronic device 100 may be a battery-powered device and as shown includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator assembly 120, one or more optional force sensors 122, an auxiliary input/output (I/O) subsystem 124, a data port 126, a speaker 128, a microphone 130, short-range communications 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device may be displayed on the touch-sensitive display 118 via the processor 102. However, the display 112 is not limited to the touch-sensitive display 118 described herein.

The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150).

Alternatively, user identification information may be programmed into the flash memory 110 or performed using other techniques.

The portable electronic device 100 also includes an operating system 146 and software components 148 that are executed by the processor 102 and which may be stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. The speaker 128 may output audible information converted from electrical signals, and the microphone 130 may convert audible information into electrical signals for processing.

Turning now to FIGS. 2 to 11, illustrated generally therein is a portable electronic device 200 according to one embodiment.

Figures 2, 3:
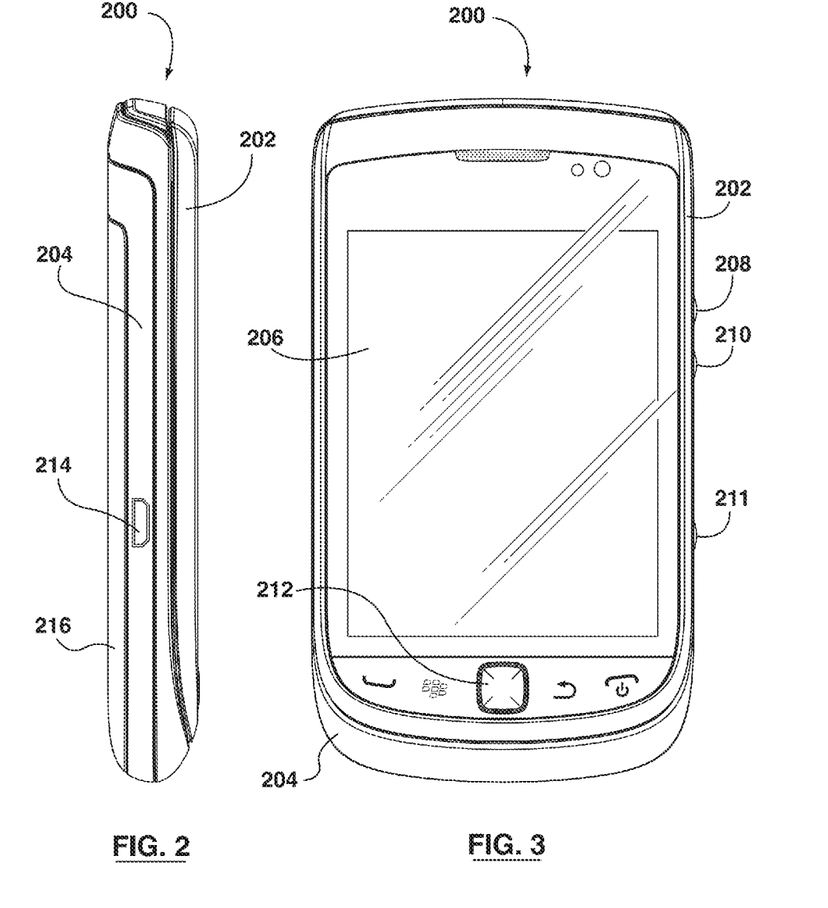
FIG. 2 is a first side view of a portable electronic device according to one embodiment shown in a closed position.
FIG. 3 is a front view of the portable electronic device of FIG. 2.
Figure 4:
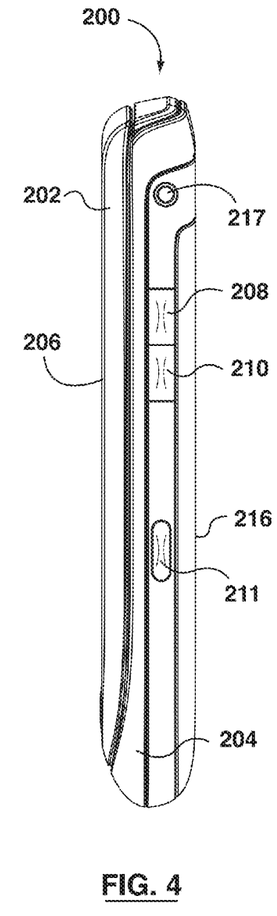
FIG. 4 is a second side view of the portable electronic device of FIG. 2.
Figure 5:
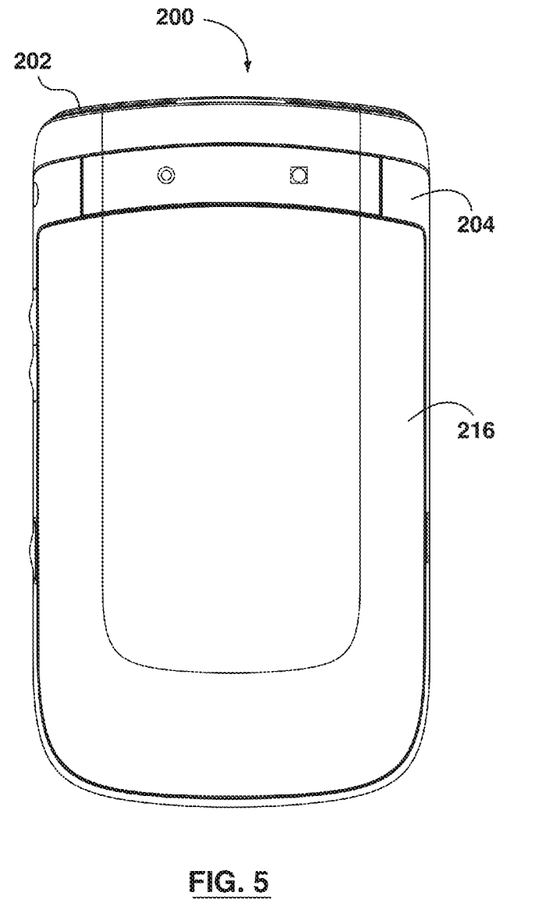
FIG. 5 is a back view of the portable electronic device of FIG. 2.
Figures 6, 7:
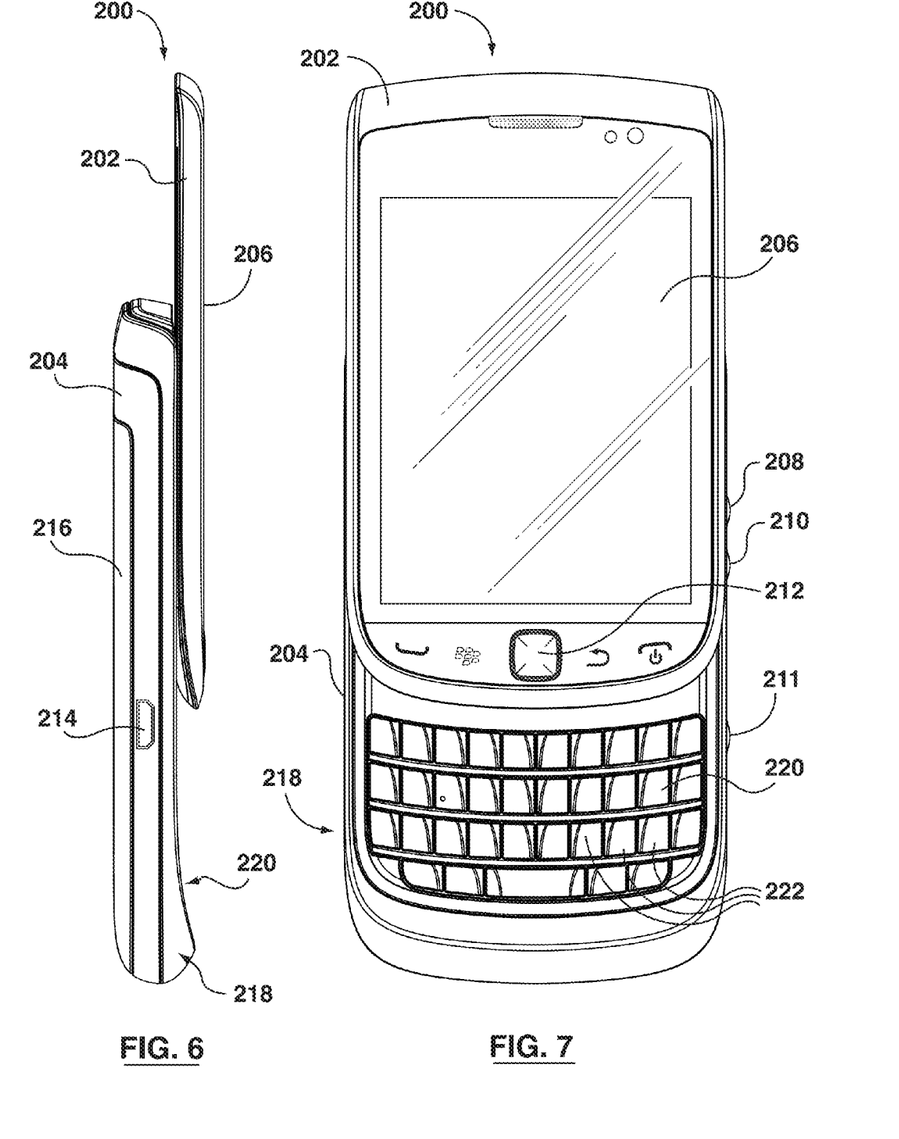
FIG. 6 is a first side view of the portable electronic device of FIG. 2 shown in an open position.
FIG. 7 is a front view of the portable electronic device of FIG. 6.
Figure 8:
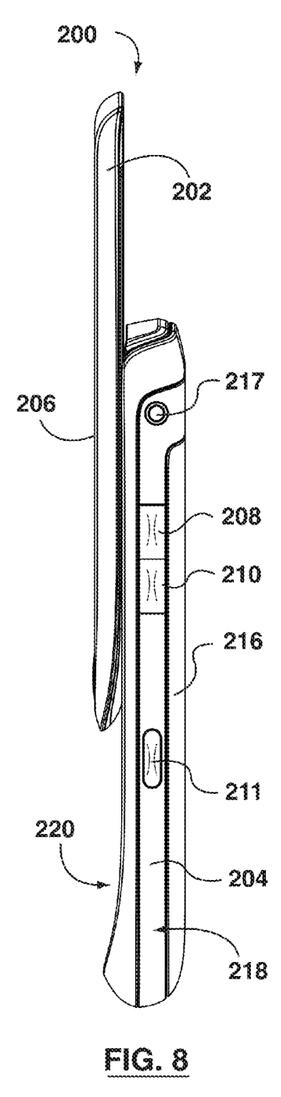
FIG. 8 is a second side view of the portable electronic device of FIG. 6.
Figure 9:
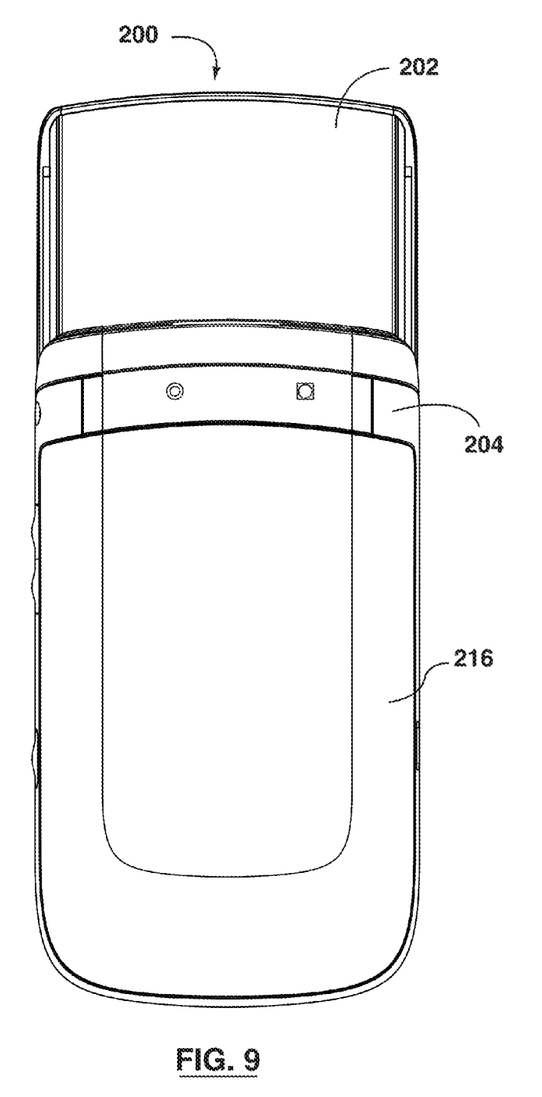
FIG. 9 is a back view of the portable electronic device of FIG. 6.
Figure 10:
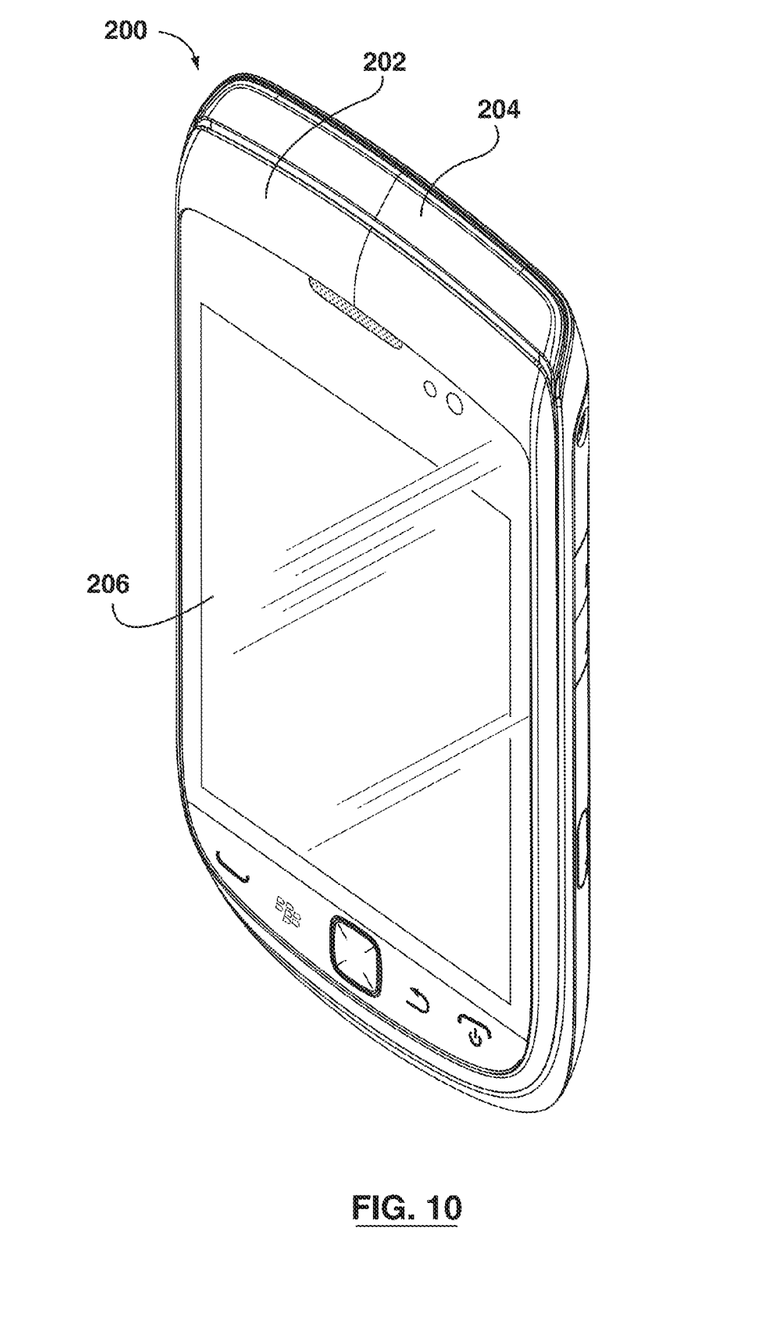
FIG. 10 is a perspective view of the portable electronic device of FIG. 2 shown in the closed position.
Figure 11:
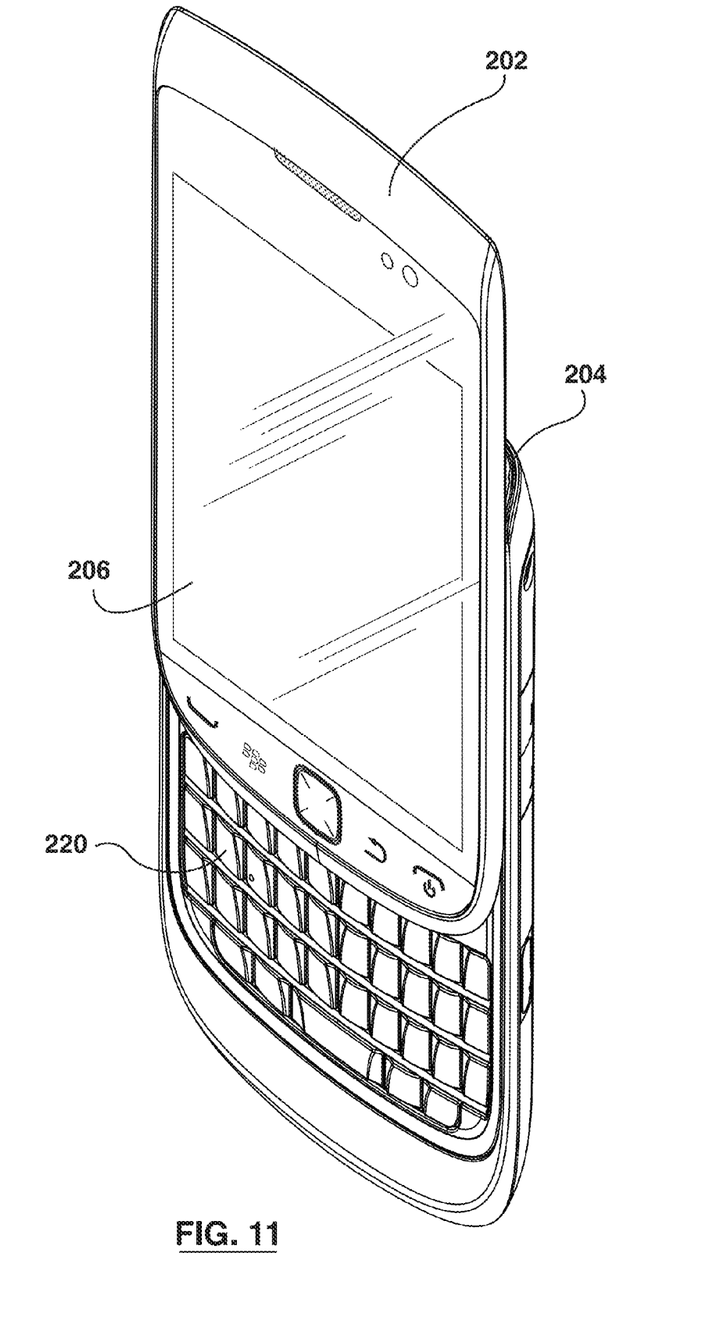
FIG. 11 is a perspective view of the portable electronic device of FIG. 6 shown in the open position.

The portable electronic device generally includes a sliding portion 202 (or upper housing) and a base portion 204 (or lower housing). The sliding portion 202 and base portion 204 are coupled together and are generally slidable between a closed position (as shown in FIG. 2 for example) and an open position (as shown in FIG. 6 for example).

The sliding portion 202 generally includes a display 206, which could be an LCD display and which may have touch screen capabilities. In some embodiments, the display 206 could be the same as or similar to the display 118 as generally described above. In some other embodiments, the display 206 may not be a touch screen display.

One or both of the sliding portion 202 and lower housing 204 may include one or more input apparatus, such as navigation keys or buttons, a physical or virtual keyboard, a trackpad, a trackball, multimedia keys, etc. For example, the sliding portion 202 as shown includes an auxiliary input device 212. The auxiliary input device 212 may be an optical navigation module (e.g. a trackpad) that responds to user interaction, and which may be used for navigating around the display screen 206, to select objects on the display screen, or for other purposes.

In some other embodiments, the auxiliary input device 212 may be a mechanical device that responds to user interaction (e.g. a trackball).

The display 206 and the auxiliary input device 212 are generally disposed on a front of the sliding portion 202 and exposed for user accessibility regardless of whether the portable electronic device 200 is in the open or closed positions.

The sliding portion 202 may also include other input devices, such as a dedicated phone application button, a dedicated "disconnect call" button, a home screen button, etc. In various embodiments, these input devices include optical sensors, mechanical buttons, or both.

Turning now to the base portion 204, the base portion 204 may include various buttons and other controls, such as buttons 208 and 210. In some embodiments, buttons 208, 210 could be used for navigation, to control volume or for other purposes.

The base portion 204 could also include one or more application buttons 211 that can be used for example to launch a particular application on the portable electronic device 200 (e.g. a camera application, a phone application, etc.). In some embodiments, the button 211 may be configurable by a user (e.g. the user may be able to select the particular application launched by the button 211).

As shown in FIGS. 2 and 6, the base portion 204 could also include one or more input or output ports, (e.g. I/O ports), such as a microUSB port 214 (and which could be similar to or the same as data port 126). In some examples, the port 214 may be used for data communication with the portable electronic device 200, for charging of a battery (not shown, but which could for example be battery 144) on the device 200 or for both.

As shown, the base portion 204 may also include a battery cover 216 for covering the battery (e.g. battery 144, not shown). In some embodiments, the battery cover 216 may be removable. In other embodiments, the battery cover 216 may be permanently fixed to the device.

In some embodiments, the base portion 204 may also include an audio jack 217. The audio jack 217 may be used to couple the portable electronic device 200 to a speaker, a microphone, or both, for example for use in voice communication, for listening to music on the portable electronic device 200, etc.

Turning now to FIGS. 6 to 9, as shown when the portable electronic device 200 is in the open position, a keypad 220 is exposed on a lower portion 218 of the base portion 204. The keypad 220 generally includes a plurality of alphanumeric keys 222 for inputting data into and otherwise controlling the portable electronic device 200. As shown, the keys 222 may be positioned in a plurality of rows and columns. In some embodiments, the keys 222 may represent an alphabet and may be arranged with a standard keyboard layout (e.g. QWERTY, QWERTZ, DVORAK, etc.) or according to other particular patterns.

As shown in FIGS. 2 to 5, when the portable electronic device 200 is in the closed position, the keypad 220 is covered by the sliding portion 202. This may be beneficial as it may protect the keypad 220 when not in use, and may also inhibit undesired keys from being pressed when the user is carrying the portable electronic device 200 (e.g. in a pocket). In some embodiments (e.g. when the display 206 is a touchsceen), the user may be able to perform functions on the portable electronic device 200 while closed by interacting with the accessible input devices (e.g. using buttons 208, 210, 211, the auxiliary input device 212, the display screen 206 itself, etc.).

When the portable electronic device 200 is in the open position (as shown in FIGS. 6 to 9), the keypad 220 is exposed for user accessibility.

In some embodiments, the display 206 may be a touch-sensitive display. The touch-sensitive display may be a capacitive touch-sensitive display, for example, and a user's touch on the touch-sensitive display may be determined by determining an X and Y location of the touch, with the X location determined by a signal generated as a result of capacitive coupling with a first touch sensor layer and the Y location determined by the signal generated as a result of capacitive coupling with another touch sensor layer.

Each of the touch-sensor layers may provide a signal to a controller that represents the respective X and Y touch location values. Thus a feature such as a virtual button or other feature displayed on the touch-sensitive display may be selected by a mapping of the touch location to a feature on the touch-sensitive display.

In some embodiments, the portable electronic device 200 is generally taller than it is wide. In such embodiments, as the portable electronic device 200 moves between the open position and the closed position, the sliding portion 202 and base portion 204 move along a longitudinal axis of the portable electronic device 200

One challenge presented with portable slidable electronic devices (e.g. devices that slide between open and closed positions, such as the portable electronic device 200) is that it can be difficult to electrically couple the display (e.g. display 206) in the sliding portion (e.g. sliding portion 202) to a printed circuit board (PCB) that is normally located in the base portion (e.g. base portion 204) during assembly of the portable electronic device 200.

In some cases, the electrical connection between the display and the PCB can be made using a flex connector (such as a flexible flat connector (FFC)). However, in conventional devices this flex connector is often difficult to connect to the PCB and prone to damage. In particular, during assembly of such a device an assembler normally needs to ensure that the flex connector does not come out of position or become misaligned as the flex connector is being connected to the PCB and the two portions of the device (e.g. the sliding portion and the base portion) are joined together. To accomplish this, the flex connector is normally formed into a loose loop as it is connected to the PCB.

This loop provides slack in the flex connector that can accommodate the relative movement of the base portion and sliding portion. Specifically, during use of the device, this loop is cycled (e.g. repeatedly extending and contracting) as the portable electronic device is opened and closed. Because of this cycling, if the flex connector is not installed properly (as is often the case) the resulting misalignment of the flex connector is prone to cause breakage or connection issues, particularly since the flex connector may experience tens or even hundreds of thousands of cycles during the life of the device.

Some of the embodiments described herein attempt to address this challenge. In particular, according to some embodiments as described herein, a flex connector is fixed in place or secured to a subassembly (such as a slidable base plate on the sliding portion 202) before the sliding portion 202 is engaged with the base portion 204. This tends to ensure that the flex connector, particularly the "dynamic region" of the flex connector, can be properly aligned and secured in place before the base portion 204 is coupled to the sliding portion 202.

The subassembly portion is then subsequently coupled to the base portion 204. Accordingly, a person who is assembling the portable electronic device 200 will be in a better position to properly couple the flex connector to the PCB, since that person will be working with only the "connector end" of the flex connector, and not the whole flex connector. Performing the connection as a "two-step" process can inhibit undesirable wrinkling or misalignment of the flex connector, and tends to decrease the risk of flex connector failure.

In some embodiments, coupling the flex connector to a subassembly before joining the sliding portion and the base portion may also help ensure good electrical ground connections between the flex connector, the subassembly and the base portion. This may be desirable to help maintain proper electrical operation of the device, particularly the display. For example, in some embodiments the flex connector can be adhered to a subassembly portion of the slide assembly with conductive adhesive, using tabs and slots, and so on, ensuring a good mechanical and electrical coupling therebetween.

Accordingly, the dynamic portion of the flex connector can be isolated and protected during assembly, leaving a much smaller connector end of the flex connector exposed for coupling to the PCB. In particular, the connector end of the flex connector can be provided at a back of the PCB (where it is exposed for manipulation) rather than the front of the PCB, which tends to make connecting the flex connector to the PCB easier and encourage proper installation.

Figure 12:
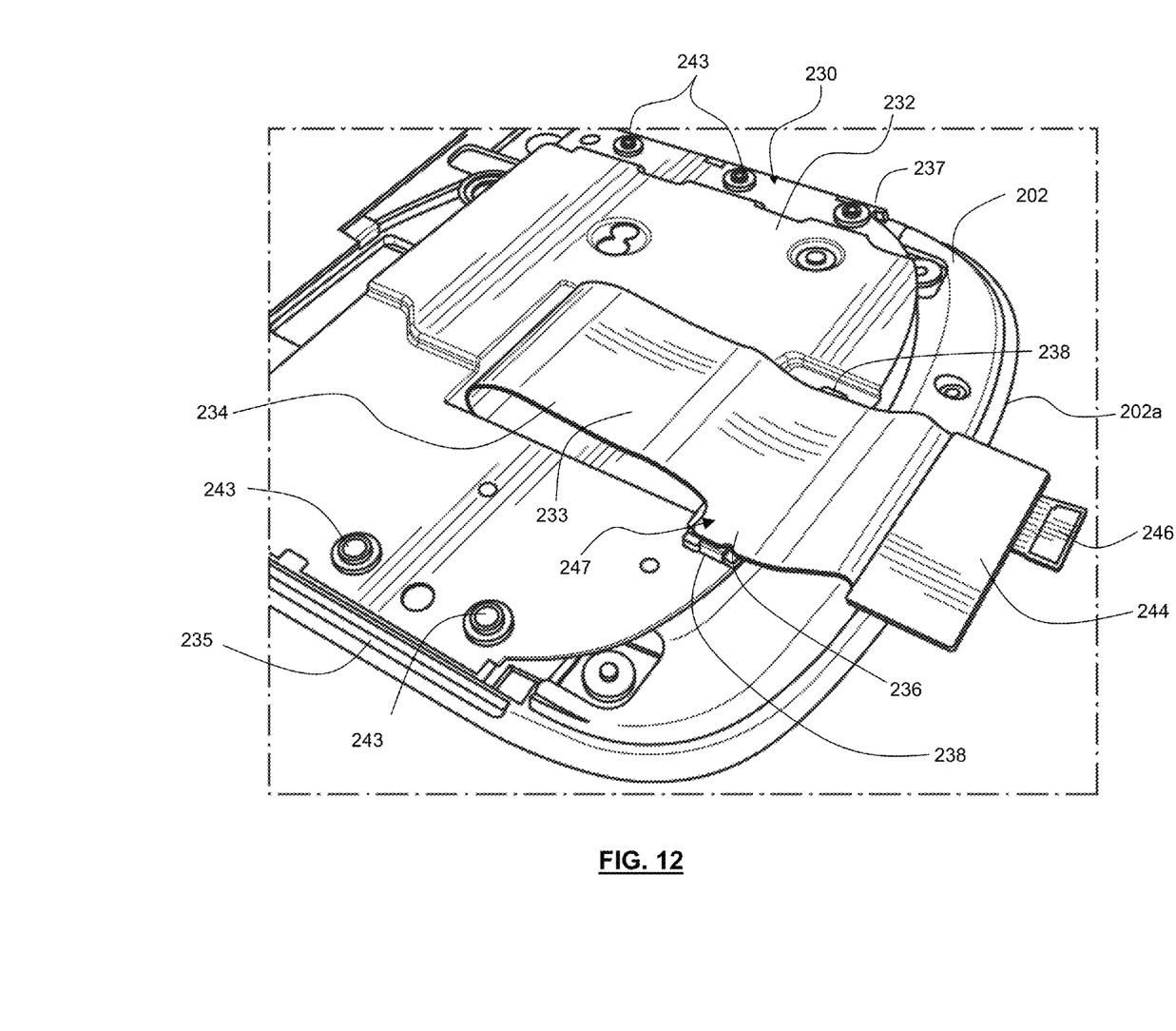
FIG. 12 is a rear perspective view of the sliding portion of the portable electronic device showing a flex connector.
Figure 13:
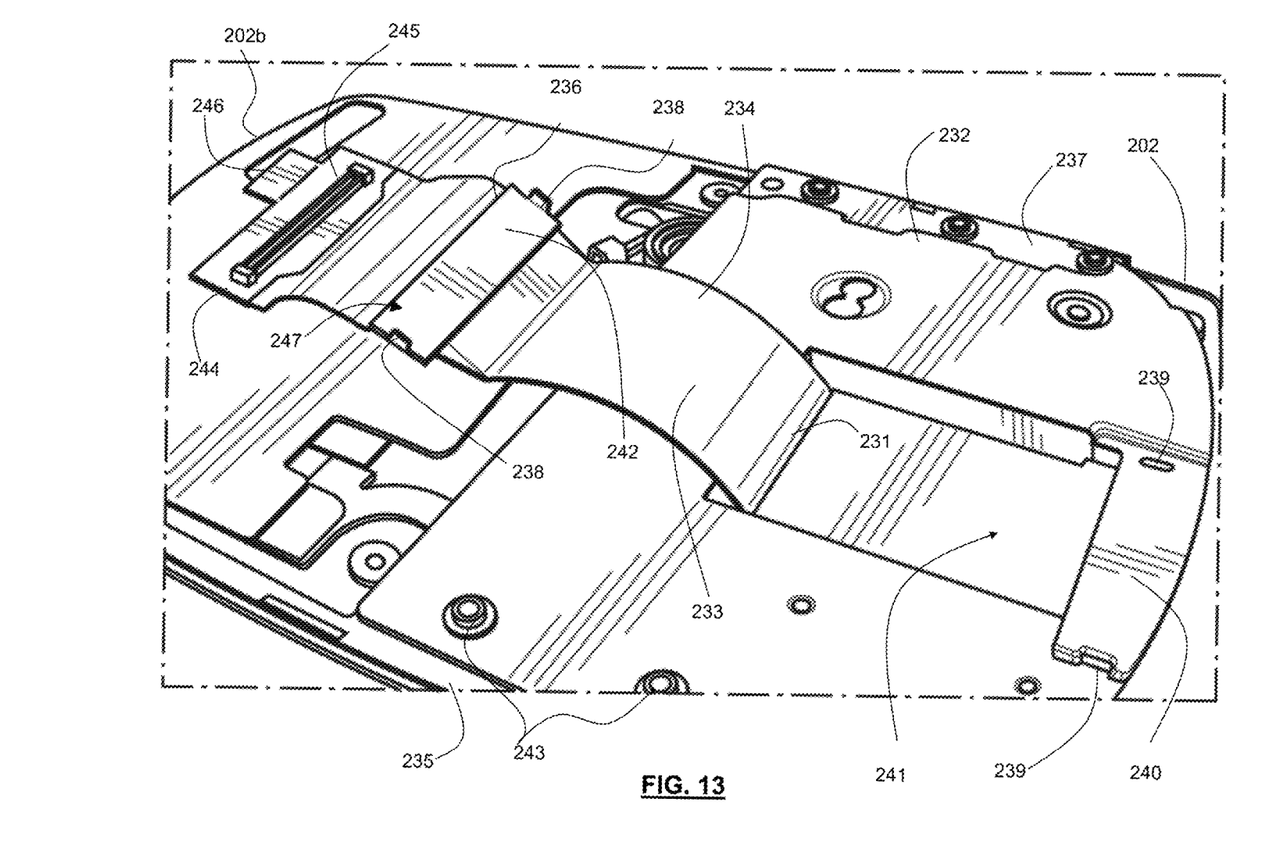
FIG. 13 is another rear perspective view of the sliding portion of FIG. 12.

Reference is now made to FIGS. 12 and 13, which illustrate a rear perspective view of the sliding portion 202 before being coupled to the base portion 204. As shown, a back face 230 of sliding portion 202 is exposed so that a flex connector 234 is visible.

The flex connector 234 generally has a first end 231 that is coupled to the sliding portion 202 (as shown in FIG. 13) and a connector end 244 at the other end of the flex connector 234 that connects to the PCB. The flex connector 234 also includes a dynamic region 233, namely that region of the flex connector 234 that is designed to move and flex (expanding and contracting) as the portable electronic device 200 is opened and closed. The dynamic region 233 is normally very delicate, and can be easily damaged, accordingly the dynamic region 233 should be protected as much as possible during assembly and should be properly aligned to inhibit failure of the dynamic region 233.

Also shown, generally on the back face 230 of the sliding portion 202 is a guide base (or base plate) 232. The guide base 232 serves as a subassembly to which the flex connector 234 can be coupled before the base portion 204 and sliding portion 202 are joined together. In particular, during assembly, the flex connector 234 can be fed through an opening 241 defined in the guide base 232, and then the flex connector 234 and guide base 232 can be coupled together.

The guide base 232 is slidably coupled to the sliding portion 202, for example using C-channels 235, 237 provided on the side edges of the sliding portion 202, so that the guide base 232 can move with respect to the sliding portion 202. For example, in FIG. 12 the guide base 232 is shown near a bottom end 202*a* of the sliding portion 202, while in FIG. 16 the guide base 232 is shown adjacent a top end 202*b* of the sliding portion 202. As the guide base 232 moves, the dynamic region 233 of the flex connector 234 will tend to move within the opening 241.

The guide base 232 functions as the "slide mechanism" for the device 200 and once the flex connector 234 is coupled thereto, the guide base 232 can be fixed to the base portion 204. Once in place, the guide base 232 is fixed relative to the base portion 204 but slides relative to the sliding portion 202 as the device 200 is moved between the open position and closed position, with the flex connector 234 flexing to accommodate this movement.

As shown, the flex connector 234 is adapted to be coupled to the guide base 232 between the dynamic region 233 and the connector end 244, for example using an intermediate coupler 247. This intermediate coupler 247 generally provides for mechanical coupling between the flex connector 234 and the guide base 232, generally between the connector end 244 and dynamic region 233 of the flex connector 234. In some embodiments, this intermediate coupler 247 may also provide for electrical grounding between the flex connector 234 and the guide base 232.

In this example, the intermediate coupler 247 could include a slide flex backer 236 generally between the dynamic region 233 and the connector end 244. The slide flex backer 236 may help to stiffen the flex connector 234 for ensuring a good mechanical connection between the flex connector 234 and the guide base 232. As shown, the slide flex backer 236 may include alignment tabs 238 that extend outwardly from the flex connector 234 and which can be received in slots 239 on the guide base 232 to mechanically secure the flex connector 234 to the guide base 232.

In some embodiments, where the guide base 232 is made of a metal or other electrically conductive material, the tabs 238 and slots 239 may cooperate to provide for mechanical coupling as well as electrical grounding of the flex connector 234 to the guide base 232. For example, in some embodiments, the slide flex backer 236 may be made of stainless steel. In other embodiments, the slide flex backer 236 may be made of another conductive material (e.g. copper).

In some embodiments, the slots 239 may be in a recessed portion 240 of the guide base 232 that is sized and shaped to receive the slide flex backer 236 therein (as illustrated in FIG. 12).

In some embodiments conductive tape 242 (e.g. copper tape) or another conductive material may be provided on an inner surface of the slide flex backer 236 (e.g. between the tabs 238) to help provide a good electrical connection between the slide flex backer 236 and the metal or other conductive surface of the guide base 232 in the recessed portion 240. For example, flex copper may be exposed behind the slide flex backer 236, and a conductive adhesive may be used to secure the slide flex backer 236 to the guide base 232.

In some embodiments, one or more contacts 243 on the guide base 232 may be used to ground the guide base 232 to the base portion 204.

In other embodiments, the guide base 232 need not be made of a metal or conductive material, but could be made of other materials (e.g. rigid plastics).

In some embodiments, the connector end 244 of the flex connector 234 may include a stiffener that may help to stiffen the flex connector 234. The connector end 244 may also include an electrical connector 246 for electrically connecting to the PCB, and a mechanical connector 245 for mechanically coupling the flex connector 234 to the PCB. The mechanical connector 245 can help secure the PCB and connector end 244 of the dynamic flex 234, which may help to ensure that the electrical connector 246 does not experience substantially large mechanical stresses, which may help protect the electrical connector 246 during use.

Figure 14:
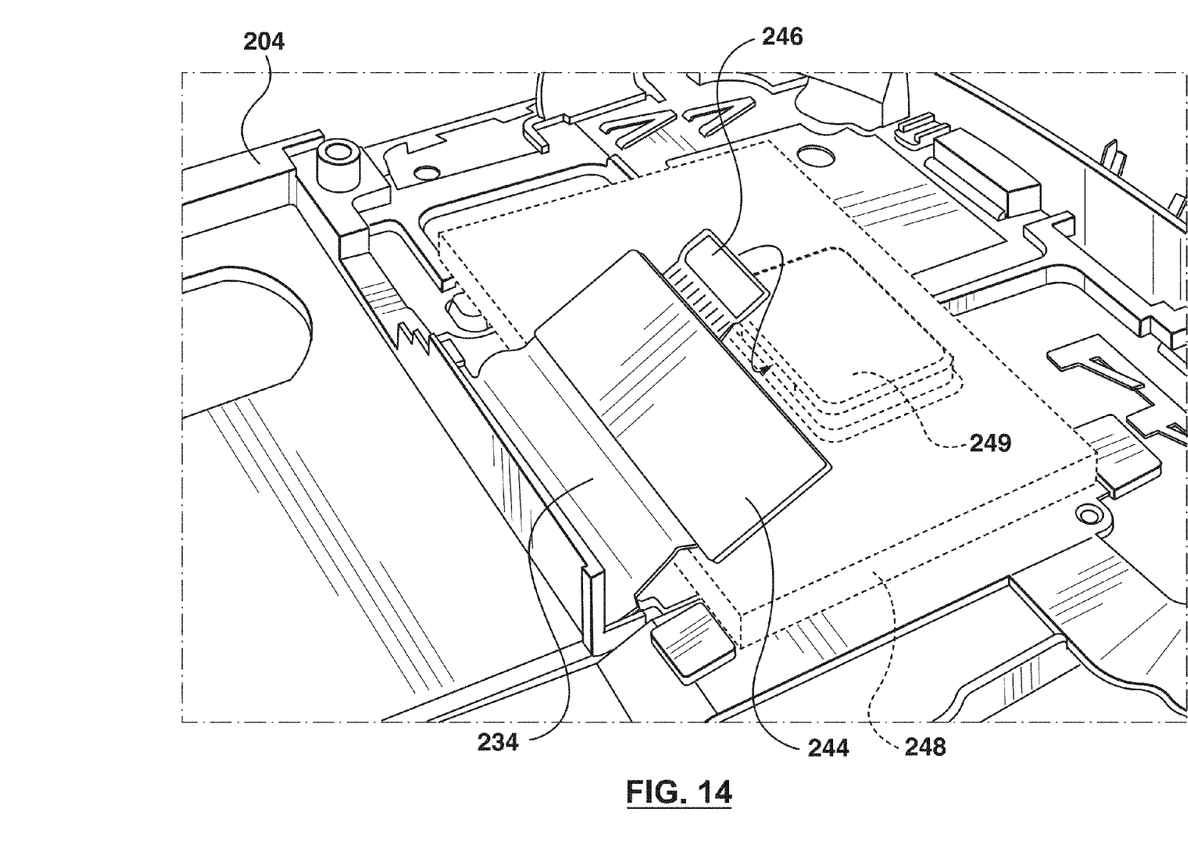
FIG. 14 is a rear perspective view of the sliding portion coupled to the lower housing and showing the flex connector and PCB.

Turning now to FIG. 14, once the flex connector 234 has been coupled to the guide base 232, assembly of the portable electronic device 200 can continue by coupling the guide base 232 to the base portion 204. As shown in this figure, when the guide base 232 has been secured to the base portion 204, the connector end 244 with electrical connector 246 remains exposed. The connector end 244 can be wrapped to the back side of a PCB 248 (shown in broken lines) to allow the electrical connector 246 to be connected to a connector 249 (also shown in broken lines) on the PCB 248 on the base portion 204. The mechanical connector 245 can also be engaged to the PCB 248 using a mechanical connector (not shown) to secure the connector end 244 in place.

Figure 15:
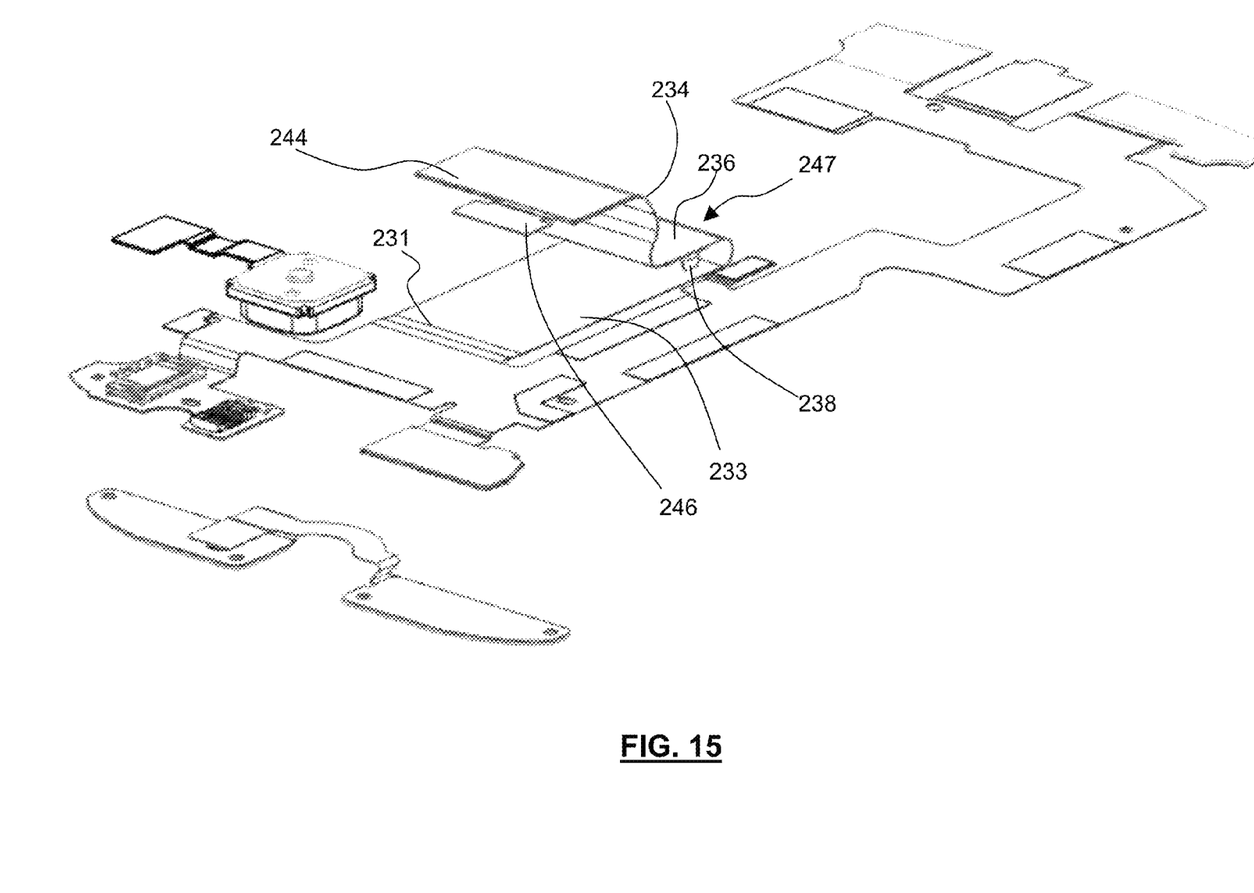
FIG. 15 is another perspective view of the flex connector.

Turning now to FIG. 15, another perspective view of the flex connector 234 is shown generally with the other components of the portable electronic device 200 removed for clarity. In this figure, the dynamic region 233 of the flex connector 234 is shown generally flat.

Figure 16:
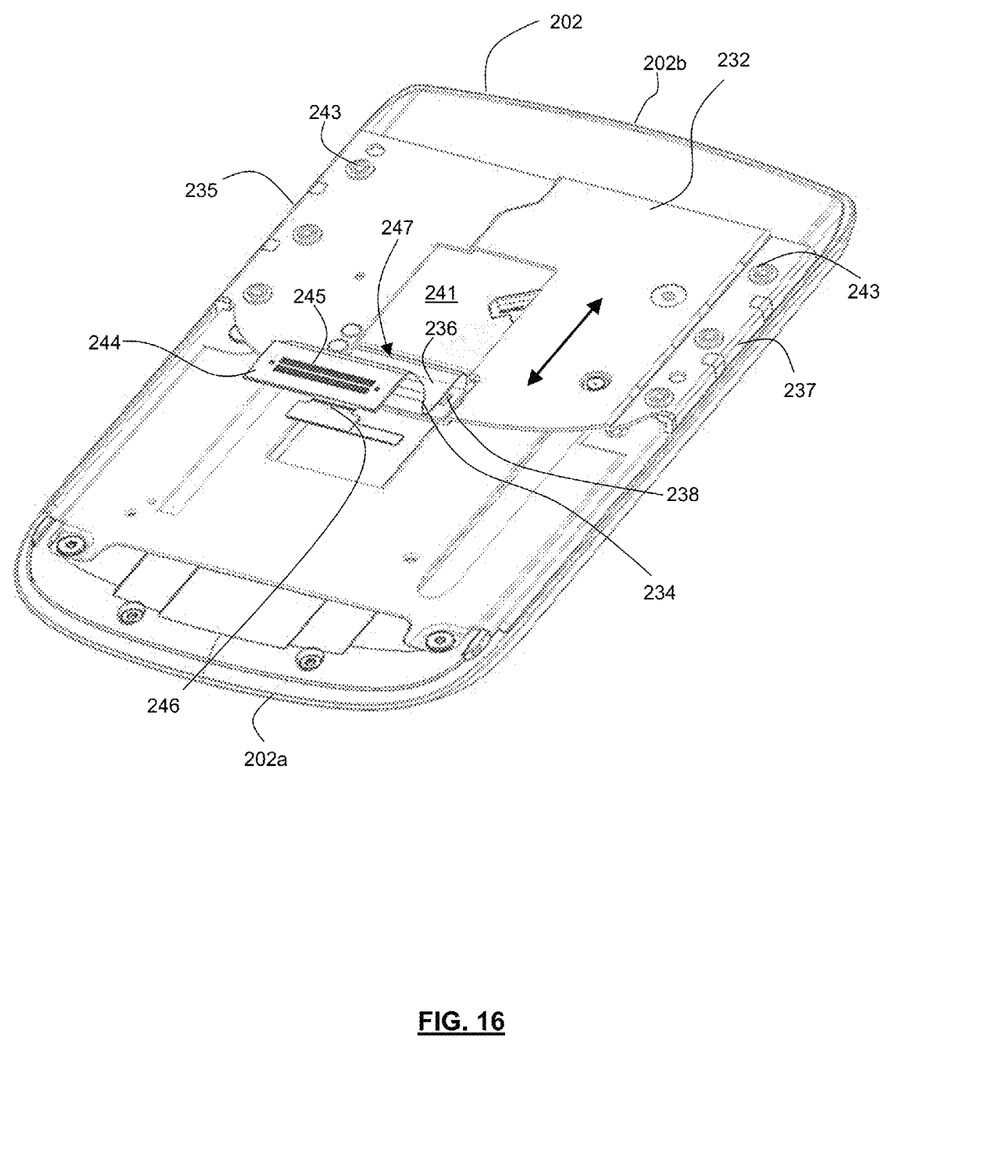
FIG. 16 is another perspective view of the sliding portion with a guide base removed.

Turning now to FIG. 16, illustrated therein is a rear perspective view of the sliding portion 202 with the guide base 232 moved towards the top end 202b of the sliding portion 202, and showing the flex connector 234. As evident from comparison of FIGS. 12 and 16, the flex connector 234 (and in particular the dynamic region 233) in FIG. 16 has flattened to accommodate the movement of the guide base 232 towards the top end 202b of the device 200.

Generally, the embodiments as described herein may provide advantages over previous assembly methods and devices.

In particular, by coupling the flex connector to the guide base before the portions of the device are assembled can protect the flex connector and may provide for better flex connector coupling. For example, a person who is assembling the portable electronic device will be in a better position to properly couple the flex connector to the PCB, since they will be working with only the "connector end" of the flex connector, and not the whole flex connector. Performing this "two-step" process tends to make connecting the flex connector to the PCB easier and encourage proper installation, which can inhibit undesirable wrinkling or misalignment of the flex connector, and tends to decrease the risk of flex connector failure. This approach may also help ensure good electrical ground connections between the flex connector, the subassembly and the base portion.

While the above description provides examples of one or more processes or apparatuses, it will be appreciated that other processes or apparatuses may be within the scope of the accompanying claims.

The invention claimed is:

1. A portable electronic device, comprising:
   a base portion; and
   a slider assembly to be coupled to the base portion, the slider assembly comprising:
   a sliding portion;
   a guide base to couple the slider assembly to the base portion, the guide base having a first side and a second side opposite the first side, the sliding portion being coupled to the first side of the guide base, the guide base to enable the sliding portion to move between a closed position and an open position relative to the base portion when the slider assembly is coupled to the base portion;

a flex connector having a first end, a connector end, and a dynamic region between the first end and the connector end, the first end being coupled to the sliding portion; and an intermediate coupler positioned between the connector end and the dynamic region, the intermediate coupler to couple the flex connector to the second side of the guide base prior to coupling the slider assembly to the base portion, the intermediate coupler to enable the dynamic region of the flex connector to slide relative to the guide base when the sliding portion moves between the open and closed positions.

2. The portable electronic device of claim 1, wherein the guide base is rigidly coupled to the base portion and the guide base is slidably coupled to the sliding portion to enable the sliding portion to slide relative to the base portion between the open and closed positions when the slider assembly is coupled to the base portion.

3. The portable electronic device of claim 1, wherein the guide base has an opening adapted to receive the flex connector, the opening further adapted to accommodate movement of the dynamic region of the flex connector therein as the base portion and sliding portion move between the closed position and the open position.

4. The portable electronic device of claim 1, wherein the intermediate coupler electrically grounds the flex connector to the guide base.

5. The portable electronic device of claim 1, wherein the intermediate coupler includes alignment tabs adapted to be received in slots on the guide base for mechanically coupling the flex connector to the guide base.

6. The portable electronic device of claim 1, wherein the sliding portion includes a display and the first end of the flex connector is coupled to the display.

7. The portable electronic device of claim 1, wherein the base portion includes a printed circuit board (PCB), and the connector end of the flex connector is adapted to be electrically connected to the PCB after the guide base has been coupled to the base portion.

8. A method of assembling a portable electronic device, comprising:
assembling a slider comprising:
slidably coupling a sliding portion to a first side of a guide base;
coupling a first end of a flex connector to the sliding portion;
securing the flex connector to a second side the guide base via an intermediate coupler such that a dynamic portion of the flex connector between the intermediate coupler and the first end of the flex connector is movable relative to the guide base; and
coupling the slider assembly to the base portion.

9. The method of claim 8, further comprising coupling the slider assembly to the base portion via the guide base such that the guide base is fixed relative to the base portion and slidably coupled relative to the sliding portion.

10. The method of claim 8, further comprising passing the flex connector through an opening of the guide base prior to securing the flex connector to the guide base via the intermediate coupler.

11. The method of claim 8, further comprising electrically grounding the flex connector to the guide base via the intermediate coupler.

12. The method of claim 8, further comprising inserting alignment tabs of the intermediate coupler into slots formed on the guide base to couple the intermediate coupler to the guide base.

13. The method of claim 8, further comprising coupling the first end of the flex connector to a display supported by the sliding portion.

14. The method of claim 8, further comprising electrically coupling a connector end of the flex connector adjacent the intermediate coupler and opposite the first end to a printed circuit board (PCB) of the base portion after the flex portion has been coupled to the guide base via the intermediate coupler.

15. A portable electronic device comprising:
a slider to support a display;
a guide base slidably coupled to the slider and having an opening between a first side of the guide base and a second side of the guide base;
a flex connector having a first end, a second end and a dynamic portion between the first and second ends, the first end being coupled to the slider adjacent the first side of the guide base and at least a portion of the flex connector to pass through the opening of the guide base to position the second end of the flex connector adjacent the second side of the guide base when the guide base is coupled to the slider; and
an intermediate coupler coupled to the flex connector between the dynamic portion and the second end, the intermediate coupler to attach a portion of the flex connector to the second side of the guide base, the intermediate coupler to restrict movement of the second end of the flex connector relative to the guide base while enabling the dynamic portion to move relative to the guide base when the slider moves relative to the guide base.

16. The device of claim 15, further comprising a housing that contains a printed circuit board, the slider being coupled to the housing via the guide base.

17. The device of claim 16, wherein the guide base is slidably coupled to the slider and fixed relative to the housing to enable the slider to move relative to the housing.

18. The device of claim 16, wherein the slider and the guide base provide a subassembly to which the flex connector is coupled prior to coupling the housing and the guide base.

19. The device of claim 15, wherein the intermediate coupler includes a slide flex backer to stiffen the flex connector to ensure a good mechanical connection between the flex connector and the guide base.

20. The device of claim 15, wherein the guide base has a recess adjacent the opening to receive the intermediate coupler when the intermediate coupler is attached to the guide base.

* * * * *